United States Patent Office 2,799,341
Patented July 16, 1957

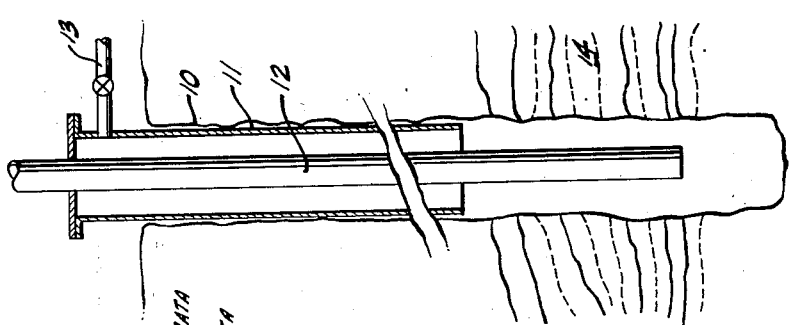
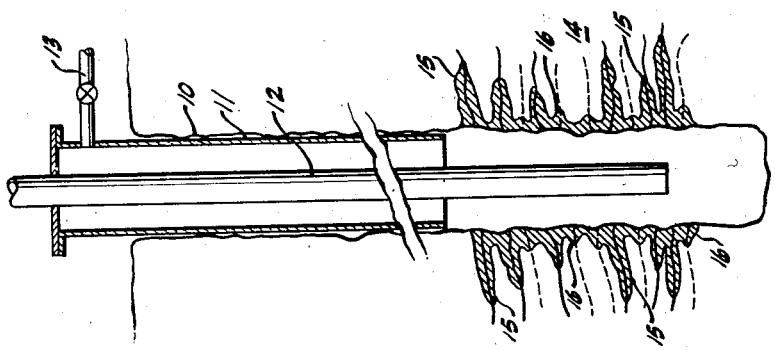
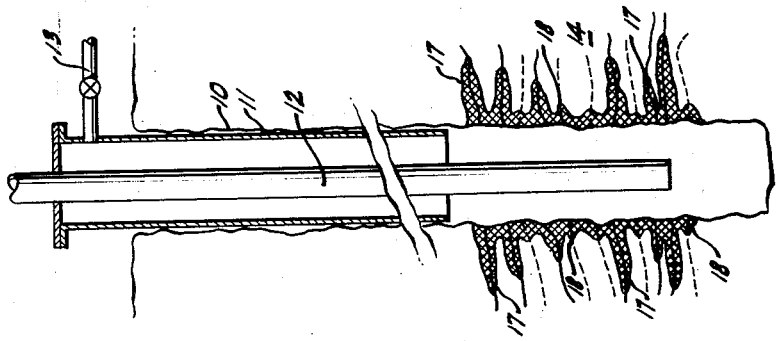

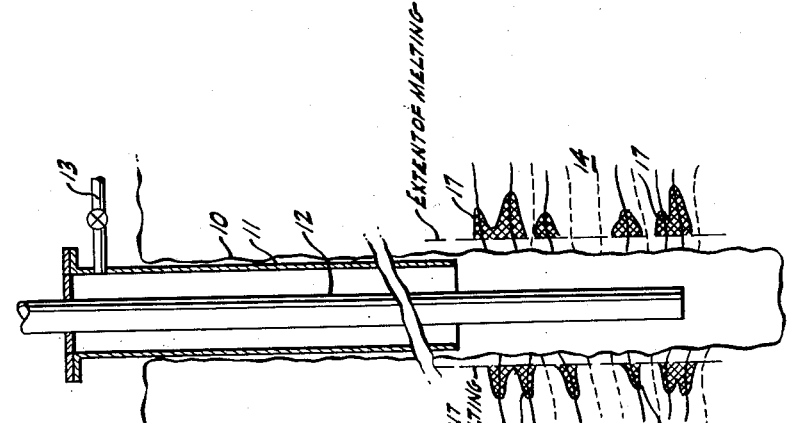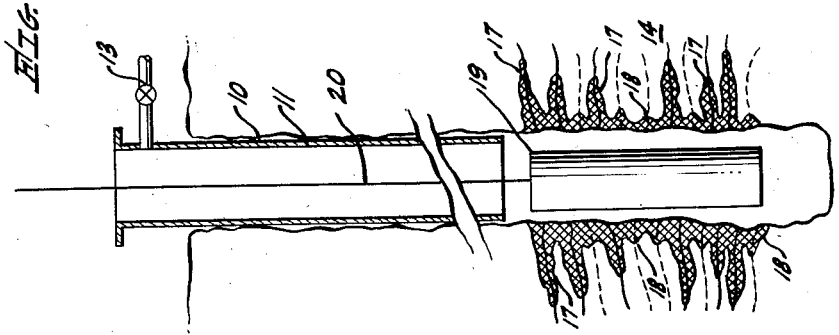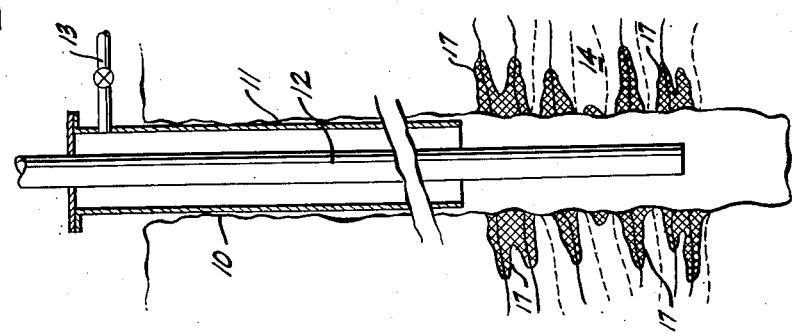

2,799,341

SELECTIVE PLUGGING IN OIL WELLS

George P. Maly, Fullerton, Calif., assignor to Union Oil Company of California, Los Angeles, Calif., a corporation of California Application March 4, 1955, Serial No. 492,243

16 Claims. (Cl. 166—25)

This invention relates to the selective plugging of subterranean formations traversed by a well bore, and in particular concerns an improved method for selectively plugging subterranean water-producing formations which lie closely adjacent to oil-producing formations.

In a great many of the oil-producing areas of the world, the production of crude oil from wells is accompanied by the production of water or brine. Well effluents comprising as much as 90 percent of water or brine and only 10 percent of petroleum are by no means uncommon. The cost of raising such water or brine to the earth's surface and of the separating it from the oil represents an economic loss, and in many instances the problem of disposing of the waste water or brine is more than one of mere economics.

In some instances the water-producing strata are more or less well-defined and lie at some distance above or below the oil-bearing strata, and in such cases the flow of water into the well can be shut off by isolating the water-bearing formation and plugging it with Portland cement or the like without similarly plugging the oil-bearing formation. Such procedure, however, requires the use of expensive special equipment, e. g., packers, cementing shoes, etc., which must be accurately positioned within the bore, and in general is a complicated and costly operation. In other instances, the oil- and water-producing strata lie very close together or are intermingled so that it is impossible to locate and isolate the two and effect water shut-off even by complicated and expensive packing and cementing techniques.

It is accordingly an object of the present invention to provide an improved method for plugging subterranean water- or brine-producing formations without plugging adjacent or co-extensive oil-producing formations.

Another object is to provide a selective well plugging method which does not require the use of well packers or other equipment for mechanically isolating one subterranean formation from another.

Other objects will be apparent from the following detailed description of the invention, and various advantages not specifically referred to herein will occur to those skilled in the art upon employment of the invention in practice.

I have now found that the above objects and related advantages may be realized by preferentially heating the water-bearing strata and thereafter forcing down the well and out into the strata traversed thereby a molten water-insoluble plugging agent which has a melting point above the ambient temperature of the well but below the temperature to which the strata have been preferentially heated. By reason of such preferential heating, the molten plugging agent penetrates more deeply into the water-bearing strata, and if the well is allowed to return to its ambient temperature the plugging agent will solidify to form a long water-insoluble plug within the water-bearing strata and only a short plug within the oil-bearing strata. The latter is then removed, as by the use of solvents, heat, or simply by putting the well back into production. Such treatment may remove a substantially equal amount of the solidified plugging agent which occupies the water-bearing strata but since the plug extends much farther into the water-bearing strata a substantial portion of the same will remain therein after all of the plug has been removed from the oil-bearing strata and will effect the desired water shut-off. Such mode of operation does not entail the use of mechanical packers to isolate one type of strata from another, and is effective regardless of how closely the oil- and water-bearing strata are associated or intermingled. As is hereinafter more fully explained, suitable plugging agents may comprise very inexpensive materials, and preferential heating of the water-bearing strata is accomplished by the simplest of methods.

In the accompanying drawings which form a part of this application, Figure 1 diagrammatically represents a typical well bore prior to its being selectively plugged in accordance with the process of the invention. Figure 2 represents the same well after it has been selectively heated in accordance with the first basic step of said process. Figure 3 represents the well after injection of the plugging agent in accordance with the second basic step of the process. Figure 4 represents the well after removal of a portion of the plugging agent in accordance with the third basic step of the process. Figure 5 illustrates the use of heating means to remove a portion of the plugging-agent, and Figure 6 represents the well after such means have been so employed.

Referring now to Figure 1, of bore hole 10 is shown partially lined with well casing 11 and provided with well tubing 12 through which fluids can be introduced into or withdrawn from the bore. Valved conduit 13 communicates with the well annulus and may likewise be employed for the introduction or withdrawal of fluids. Well bore 10 traverses a water- and oil-bearing formation 14, the water-bearing strata thereof being designated by solid lines and the oil-bearing strata being designated by broken lines.

The first step of the process comprises what is herein termed "preferential heating" of the water-bearing strata, and is accomplished by forcing hot water down the bore, either through tubing 12 or via conduit 13 and the well annulus, sufficient pressure being applied to force such water out into the various strata traversed by the bore. Since the water-bearing strata are preferentially water-wettable and water-permeable, at any given pressure the hot water will penetrate and carry heat farther into the water-bearing strata than into the oil-bearing strata. It is in this manner that the water-bearing strata are said to be preferentially heated, i. e., not in the sense that the water-bearing strata are heated and the oil-bearing strata are not, but in the sense that there is created within and immediately adjacent each water-bearing stratum a heated zone which extends farther back into the formation than the heated zone which is similarly and simultaneously created within and immediately adjacent each oil-bearing stratum. It is to be noted that such preferential heating is accomplished without physically isolating one type of strata from the other by means of packers or like devices, and is accomplished by application of the natural phenomenon of preferential permeability.

In lieu of water as the heat transfer medium there may be employed any fluid which is water-miscible and oil-immiscible, e. g., brine solutions, aqueous emulsions, etc. Preferably, such fluid should be relatively high-boiling although under the elevated pressures required to force the fluid into the strata the boiling points of even normally low-boiling fluids are raised to relatively high values. Water or brine is of course the preferred heat transfer medium because of its availability and substantial lack of cost, and under even ordinary well pressures its boiling point is sufficiently high that it is capable of transferring very large quantities of heat to the subterranean strata. If desired, the rate and distance which the heat transfer medium penetrates the strata may be increased by incorporating a surface active agent in such medium.

The pressure under which the hot water or other fluid heat transfer medium is forced into the subterranean strata theoretically need be only that sufficient to overcome the natural well pressure. As a practical matter, somewhat higher pressures are employed in the interests of forcing as much water as possible into the strata in as short a time as possible in order to prevent the useless dissipation of heat into unwanted areas. However, at very high pressures the difference between the permeabilities of the two types of strata for water-miscible fluids is greatly decreased, with the result that the aforementioned heated zones associated with each type of strata extend for substantially the same distance back from the borehole and no preferential heating is attained. Accordingly, it is necessary that the pressure at which the hot fluid heat transfer medium is forced into the well be sufficient to cause the fluid to be injected into the water-bearing strata as rapidly as possible without destroying or greatly decreasing the preferential permeability of the two types of strata with respect to such medium. The optimum pressure will depend upon the nature of the heat transfer medium and upon the relative permeabilities of the respective strata with respect thereto, and can readily be determined by experiments carried out on core samples.

The temperature to which the water-bearing strata are preferentially heated must of course be above the melting point of the plugging agent employed, and may conveniently be of the order of 100°–350° F.

Upon completion of injection of the heat transfer medium, the well is allowed to stand under pressure for a period of time sufficient for the heat content of the medium to be transferred to the subterranean strata into which it has been forced. The pressure is then released and the medium is withdrawn from the bore, as by pumping, bailing or other conventional means.

Figure 2 is a diagrammatic respresentation of the well after withdrawal of the heat transfer medium therefrom. As previously explained, the preferential permeability of the water-bearing strata for the water-miscible heat transfer medium causes the creation of heated zones immediately adjacent each water-bearing stratum and extending back from the borehole a considerable distance farther than the heated zones similarly and simultaneously created adjacent the oil-bearing strata. In Figure 2 these zones are designated 15 and 16, respectively.

The second major step of the process consists in introducing into the well and out into the strata traversed thereby a molten water-insoluble plugging agent whose melting point is above the normal formation temperature but below that of the heated zones which have been created within the formation by the use of a water-miscible heat transfer medium as explained above. Such agent penetrates each stratum as a fluid for a distance corresponding to the heated zone associated therewith, but will solidify upon contacting the unheated portions of the formation. Consequently, the molten plugging agent is deposited within the formation in a pattern corresponding closely to the pattern of heated zones. The well is then allowed to stand under pressure until the added heat has dissipated and the formation returns to its normal temperature, whereupon the plugging agent solidifies in the pattern previously described, i. e., the water-bearing strata will be plugged with the solidified plugging agent for a considerable distance back from the borehole whereas the solid plug in the oil-bearing strata will extend only a short distance back from the hole. The pattern which the solidified plugging agent thus takes within the formation is illustrated diagrammatically by Figure 3, wherein 17 designates the plug in the water-bearing strata and 18 designates the plug in the oil-bearing strata.

As stated, the plugging agent may be any material which is water-insoluble and which has a melting point above the normal formation temperature but below that to which the formation is heated by the aforementioned preferential heating technique. As is hereinafter more fully explained, it is preferably, although not necessarily, oil-soluble. Waxes, asphalt, bitumen and the like are well-suited as are thermophastic resins such as polystyrene, polymethylmethacrylate, etc. Also, the solid plugging agent may be one formed in situ under influence of heat, e. g., liquid monomeric styrene may be injected into the preferentially heated strata and allowed to polymerize therein to form solid polystyrene under the influence of the added heat. Crude paraffin containing normally incident amounts of asphalt and bitumen is suitable, although in some instances refined paraffin is preferred by reason of its sharper melting point. Other suitable materials include vegetable waxes and resins, animal waxes, synthetic waxes, natural and synthetic tars, etc.

The third major step of the process consists in removing the solidified plugging agent from the oil-bearing strata while allowing all or part of such agent to remain in the water-bearing strata. This may be accomplished in several ways. According to one mode of operation, an oil-soluble plugging agent is employed and after the well has been allowed to stand under pressure until the plugging agent solidifies within the strata, the pressure is released and the well is put back into production. The oil which flows towards the bore under the normal formation pressure will dissolve the oil-soluble plugging agent from the oil-bearing strata, leaving such strata as clear channels for oil to flow into the bore. Figure 4 diagrammatically illustrates the condition of the borehole and the strata traversed thereby after removal of the solidified plugging agent in this manner.

According to an alternative mode of operation, illustrated by Figures 5 and 6, the solidified plugging agent is removed from the oil-bearing strata by the use of heat. In Figure 5, the well is shown as in Figure 3 with the water- and oil-bearing strata obstructed by plugs 17 and 18, respectively. Well tubing 12 has been withdrawn from the bore to allow an electric heater 19 supported by cable 20 to be inserted therein opposite the plugged strata. When the heater is operated it will radiate heat to the adjacent formation and to the solidified plugging agent contained therein, and as the latter reaches its melting temperature it will liquify and flow from the strata in which it is lodged. Such melting is of course non-preferential, i. e., the plugging agent in the water-bearing strata will melt just as fast as that in the oil-bearing strata. However, since the latter extends within the strata for only a short distance back from the bore hole, it will be completely liquified and will be expelled from the strata by the pressure of the oil behind it much sooner than will the plugging agent which fills the water-bearing strata. Accordingly, by stopping the heating as soon as the plug has been melted and expelled from the oil-bearing strata, a large proportion of the plug will still remain in the water-bearing strata, thereby achieving the desired water shut-off. After removal of the heater, the tubing is run back into the well and production resumed. Figure 6 illustrates the condition of the well after completion of the operation, with solidified plugging agent 17 occupying the water-bearing strata back beyond the line of extent of melting. As will be readily apparent, when this type of operation is employed the plugging agent need not be oil-soluble but should be one having a relatively sharp melting point and which melts to a liquid of relatively low viscosity. Paraffin is well suited to the practice of this particular embodiment.

According to a third mode of operation, the solidified plugging agent is removed from the oil-bearing strata by means of solvents introduced into the well from the earth's surface. The principle which applies in this instance is very similar to that which applies when the plug is removed by melting, i. e., the solvent will remove approximately the same amount of plugging agent from the water-bearing and oil-bearing strata alike but since the plug extends within the oil-bearing strata for only a short distance it will be dissolved therefrom before all of the plugging agent is dissolved from the water-bearing strata. Upon completion of the operation, the well will appear as shown in Figure 6, with the lines of "extent of melting" being changed to lines of "extent of solvent penetration." When following such mode of operation the plugging agent should of course be one which is readily soluble in relatively inexpensive solvents, e. g., gasoline, benzene, acetone, etc. Synthetic resins such as the polystyrene and the acrylates are well suited for such operation.

It will be apparent that the process of the invention is susceptible of many modifications. For example, in the preferential heating operation a heating device may be positioned within the well to compensate for the heat lost from the heat transfer medium while it is being forced down the bore and out into the strata traversed thereby. A heater may similarly be employed during injection of the plugging agent into the preferentially heated formation to insure such agent remaining in the fluid state until it has penetrated as deeply as possible into the strata. Also, in some instances it may be desirable to hasten cooling of the formation to its normal temperature and solidification of the plugging agent within the strata by circulating a refrigerating agent, e. g., cold water, through the bore subsequent to the injection of the fluid plugging agent. Also, in removing the solidified plug from the oil-bearing formation by means of heat, a liquid or gaseous heat transfer medium, e. g., hot water, heated gases, etc., can be employed in lieu of or in conjunction with an electric heater or the like, and when solvents are employed for this purpose they may be heated or employed in connection with a heater positioned in the well bore. In general, the invention consists in preferentially heating the water-bearing strata by injecting a heated water-miscible liquid into the formations traversed by the bore, followed by removal of such liquid and injection of a liquid material which forms a water-insoluble solid at the normal well temperature, after which the formation is allowed to cool to its normal temperature and the solidified material is removed from the oil-bearing strata; it is not limited to the use of any particular plugging agent or heat transfer medium nor to any particular techniques or methods for introducing the materials into the well and the formations traversed thereby.

Other modes of applying the principle of my invention may be employed instead of those explained, change being made as regards the materials or methods employed, provided the step or steps stated by any of the following claims, or the equivalent of such stated step or steps, be employed.

I, therefore, particularly point out and distinctly claim as my invention:

1. The method of plugging a subterranean formation comprising a plurality of closely associated vertically spaced water-bearing and oil-bearing strata communicating with a well bore which comprises (1) injecting into both of said types of strata a heated water-miscible oil-immiscible liquid under a pressure sufficient to force said liquid into the water-bearing strata for an arbitrary distance back from said bore but insufficient to force said liquid an equal distance into the oil-bearing strata; (2) allowing said liquid to remain in and transfer heat to said strata, whereby there are formed heated zones immediately adjacent to and extending along the length of said strata, the heated zones immediately adjacent the water-bearing strata extending farther into the formation than the heated zones immediately adjacent the oil-bearing strata; (3) withdrawing said liquid from said strata; (4) injecting into the said strata a liquid composition capable of forming therein a water-insoluble solid at the normal formation temperature, whereby said composition is deposited in the formation in a pattern corresponding to that of said heated zones; (5) retaining said composition within the formation while heat is dissipated from said heated zones and said solid is formed within said strata in a pattern corresponding to that of said heated zones; and (6) treating said solid to effect its removal from said strata, said treatment being carried out for a period of time sufficient to remove substantially all of said solid from the oil-bearing strata but insufficient to remove all of said solid from the water-bearing strata.

2. The method of claim 1 wherein the said water-miscible oil-immiscible liquid employed in step (1) is water.

3. The method of claim 1 wherein, in step (6), the said treatment comprises introducing a liquid solvent for the said solid into the well bore and maintaining said solvent therein for a period of time sufficient to dissolve substantially all of said solid in the oil-bearing strata but insufficient to dissolve all of said solid in the water-bearing strata, and thereafter removing said solvent containing dissolved solid from the well bore.

4. The method of claim 1 wherein, during step (4), a source of heat is positioned within the bore adjacent said formation.

5. The method of claim 1 wherein, during step (5), a refrigerating medium is circulated within the bore hole to assist the said dissipation of heat from said heated zones.

6. The method of plugging a subterranean formation comprising a plurality of closely associated vertically spaced water-bearing and oil-bearing strata communicating with a well bore which comprises: (1) injecting hot water into both of said types of strata under a pressure sufficient to force it into the water-bearing strata for an arbitrary distance back from said bore but insufficient to force it an equal distance into the oil-bearing strata; (2) allowing said hot water to remain in and transfer heat to said strata, whereby there are formed heated zones immediately adjacent to and extending along the length of said strata, the heated zones immediately adjacent the water-bearing strata extending farther into the formation than the heated zones immediately adjacent the oil-bearing strata; (3) withdrawing said water from said strata; (4) injecting into said strata a molten water-insoluble plugging composition having a melting point above the normal formation temperature but below the temperature of said heated zones, whereby said molten composition is deposited in the formation in a pattern corresponding to that of said heated zones; (5) retaining said composition within the formation while heat is dissipated from said heated zones and said composition solidifies to form a solid plug within the formation in a pattern corresponding to that of said heated zones; and (6) treating said solid to effect its removal from said strata, said treatment being carried out for a period of time sufficient to remove substantially all of said solid from the oil-bearing strata, but insufficient to remove all of said solid from the water-bearing strata.

7. The method of claim 6 wherein the said plugging composition is oil-soluble.

8. The method of claim 6 wherein, in step (6), the said treatment comprises introducing a liquid solvent for said solid into the well bore and maintaining said solvent therein for a period of time sufficient to dissolve substantially all of said solid in the oil-bearing strata but insufficient to dissolve all of said solid in the water-bearing strata, and thereafter removing said solvent containing dissolved solid from the well bore.

9. The method of claim 6 wherein, in step (6), the said treatment consists in supplying heat to the formation in an amount and for a period of time sufficient to melt substantially only that portion of the solid plug which extends back from the bore a distance corresponding to the thickness of said plug within the oil-bearing strata.

10. The method of claim 6 wherein, in step (4), a source of heat is positioned within the bore adjacent to said formation.

11. The method of claim 6 wherein, in step (1), a source of heat is positioned within the bore adjacent to said formation.

12. The method of claim 6 wherein, in step (5), cold water is circulated within the bore to assist the said dissipation of heat from said heated zones.

13. The method of claim 6 wherein the said plugging composition is paraffin wax.

14. The method of claim 9 wherein the said plugging composition is paraffin wax.

15. The method of plugging a subterranean formation comprising a plurality of closely associated vertically spaced water-bearing and oil-bearing strata communicating with a well bore which comprises: (1) injecting hot water into both of said types of strata under a pressure sufficient to force it into the water-bearing strata for an arbitrary distance back from said bore but insufficient to force it an equal distance into the oil-bearing strata; (2) allowing said hot water to remain in and transfer heat to said strata, whereby there are formed heated zones immediately adjacent to and extending along the length of said strata, the heated zones immediately adjacent the water-bearing strata extending farther into the formation than the heated zones immediately adjacent the oil-bearing strata; (3) withdrawing said water from said strata; (4) injecting into said strata a molten water-insoluble oil-soluble plugging composition having a melting point above the normal formation temperature but below the temperature of said heated zones, whereby said molten composition is deposited in the formation in a pattern corresponding to that of said heated zones; (5) retaining said composition within the formation while heat is dissipated from said heated zones and said composition solidifies to form a solid plug within the formation in a pattern corresponding to that of said heated zones; and (6) placing the well on production, whereby the oil flowing through the oil-bearing strata to the bore dissolves the solid plug substantially only from the oil-bearing strata.

16. The method of claim 15 wherein the said plugging composition is paraffin wax.

References Cited in the file of this patent

UNITED STATES PATENTS

| | | |
|---|---|---|
| 1,307,027 | Swan | June 17, 1919 |
| 1,327,268 | Christians | Jan. 6, 1920 |
| 1,448,997 | Foggan | Mar. 20, 1923 |
| 2,366,036 | Leverett et al. | Dec. 26, 1944 |
| 2,675,881 | Cardwell | Apr. 20, 1954 |
| 2,714,929 | Nowak | Aug. 9, 1955 |